US009571216B2

(12) United States Patent
Le Pallec et al.

(10) Patent No.: US 9,571,216 B2
(45) Date of Patent: Feb. 14, 2017

(54) METHOD FOR MANAGING AND MAINTAINING AN ACCURATE DISTRIBUTION OF TIME IN A NETWORK WHEN A FAILURE OCCURS

(71) Applicant: Alcatel Lucent, Boulogne-Billancourt (FR)

(72) Inventors: Michel Le Pallec, Nozay (FR); Dinh Thai Bui, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/429,476

(22) PCT Filed: Aug. 27, 2013

(86) PCT No.: PCT/EP2013/067708
§ 371 (c)(1),
(2) Date: Mar. 19, 2015

(87) PCT Pub. No.: WO2014/044501
PCT Pub. Date: Mar. 27, 2014

(65) Prior Publication Data
US 2015/0249514 A1    Sep. 3, 2015

(30) Foreign Application Priority Data
Sep. 19, 2012   (EP) .................................... 12185080

(51) Int. Cl.
*H04J 3/06*      (2006.01)
*H04J 3/14*      (2006.01)
(Continued)

(52) U.S. Cl.
CPC ............ *H04J 3/0673* (2013.01); *H04J 3/0664* (2013.01); *H04J 3/14* (2013.01); *H04L 67/104* (2013.01); *H04L 69/28* (2013.01); *H04L 69/40* (2013.01)

(58) Field of Classification Search
None
See application file for complete search history.

(56) References Cited

U.S. PATENT DOCUMENTS 8,064,485 B1 * 11/2011  Montini ............... H04J 3/0667
                                                370/503
8,274,998 B2 *  9/2012  Belhadj ................ H04J 3/0667
                                                370/503
(Continued)

FOREIGN PATENT DOCUMENTS

EP        2367309 A1     9/2011

OTHER PUBLICATIONS

"IEEE Standard for a Precision Clock Synchronization Protocol for Networked Measurement and Control Systems" IEEE Standard, Piscataway, NJ, USA, Jul. 24, 2008 (Jul. 24, 2008), pp. 1-269.
(Continued)

*Primary Examiner* — Anh-Vu Ly
(74) *Attorney, Agent, or Firm* — Harness, Dickey & Pierce, P.L.C.

(57) ABSTRACT

A packet network includes a peer-to-peer transparent clock hardware support, a peer-to-peer transparent clock being at least used in order to measure and correct delays of link or path adjacent to network elements and NE residence time, and a Master/Slave end-to-end synchronization path including a first set of network elements A time stamped packet including at least a correction field indicating the cumulated transmission delay of the said packet along the synchronization path. A method includes a detecting a failure event; storing by the first element a measured past path delay of at least one previously transmitted time stamped packet received by the first element; and a function of the incoming current value of the received correction field, the first network element residence time, and a first value depending
(Continued)

of a measured past path delay value. A first indicator is generated when detecting a failure.

16 Claims, 5 Drawing Sheets

(51) Int. Cl.
    *H04L 29/08*     (2006.01)
    *H04L 29/06*     (2006.01)
    *H04L 29/14*     (2006.01)

(56) References Cited

U.S. PATENT DOCUMENTS

| | | | | |
|---|---|---|---|---|
| 8,416,763 | B1* | 4/2013 | Montini | H04J 3/0667 370/350 |
| 8,902,932 | B2* | 12/2014 | Belhadj | H04J 3/0667 370/503 |
| 2012/0307845 | A1 | 12/2012 | Le Pallec et al. | |
| 2013/0308658 | A1* | 11/2013 | Le Pallec | H04J 3/0697 370/503 |
| 2014/0036936 | A1* | 2/2014 | Bui | H04J 3/0664 370/503 |
| 2014/0092922 | A1* | 4/2014 | Le Pallec | H04L 43/50 370/503 |
| 2014/0362872 | A1* | 12/2014 | Grenabo | H04J 3/0667 370/507 |
| 2015/0229511 | A1* | 8/2015 | Le Pallec | H04J 3/0673 370/217 |

OTHER PUBLICATIONS

Meier, Sven, et al.: IEEE 1588 applied in the environment of high availability LANs Information Sciences and Systems, 2007. CISS '07. 41st Annual Conference On, IEEE, PI, Oct. 1, 2007 (Oct. 1, 2007), pp. 100-104.

International Search Report PCT/ISA/210 for International Application No. PCT/EP2013/067708 Dated Oct. 2, 2013.

Written Opinion of the International Searching Authority PCT/ISA/237 for International Application No. PCT/EP2013/067708 Dated Oct. 2, 2013.

\* cited by examiner

METHOD FOR MANAGING AND MAINTAINING AN ACCURATE DISTRIBUTION OF TIME IN A NETWORK WHEN A FAILURE OCCURS

TECHNICAL FIELD

The invention relates generally to communication systems which involve packet switched network, called PSN and time distribution in such a network. More precisely, the invention relates to a method for managing an accurate distribution of time, especially when the environment is degraded, i.e. when a failure occurs within an equipment or on a path of the network impacting the information transfer relating to the distribution of time. In a main aspect, the invention is related to the maintaining of operational services of time distribution and delay measurements when a IEEE Standard 1588-2008 peer delay mechanism has failed.

BACKGROUND TECHNOLOGY

It is known to implement, within a packet telecommunication network, a specific equipment or device—called thereafter as transparent clock—on a given network node/element (e.g. router or switch) aiming at taking into account this network element residence times—i.e. delays undergone by different synchronization packets to come across such a network element, it is also called as "transit delay" or "residence time".

Transparent clocks are implemented on respective network elements—e.g. routers or switches—along a communication path between a given pair of master and slave clocks or Master and Slave ports, called thereafter respectively as "Master" and "Slave". They exchange synchronization time-stamped packets aiming at distributing the time reference from the Mater to the Slave along said communication path. In this document, such time-stamped packets also called synchronization packets.

On the basis of conveying time control packets, a transparent clock can, by default, measure and inform the Slave of the associated network element residence times, said transparent clock is called as an end-to-end transparent clock. When a transparent clock is also able to measure neighboring link/path delays—said measurement method being called as the peer delay mechanism—the transparent clock is called as a peer-to-peer transparent clock.

A given pair of peer-to-peer transparent clocks are said to be "adjacent" if they are peers to each other with regards to the peer delay mechanism. Two such adjacent peer-to-peer transparent clocks can be directly connected via a network physical "link" or can by separated by a network "path" made of successive combinations of network links and network elements.

As an example of method implementing transparent clocks and time control packets, the standard IEEE 1588V2, also called Precision Time Protocol release 2 version or PTPV2, of the Institute of Electrical and Electronics Engineers (IEEE) can be considered.

In the present description, a transparent clock TC may be, as defined in the IEEE 1588V2 standard: a peer-to-peer transparent clock, "P2P TC".

Within the specific case of a full P2P TC deployment—i.e. whereby all the possible intermediate network elements between the Master and the Slave are associated with a P2P TC—the distribution of time (or frequency) is impacted when P2P TC operations fail to guarantee a correctly synchronized frequency and/or time between the Master and the Slave. Thus, corrective and proactive actions are required to deal with P2P TC failures and especially with failures related to the peer delay mechanism.

In the present document, a network architecture with full or partial deployment of P2P TCs is called as a P2P network architecture. Similarly, when a network element is supported by a P2P TC, the term "network element" and the term "peer-to-peer transparent clock" are used interchangeably.

FIG. 1 represents a P2P network architecture comprising P2P TCs ensuring path delay measurements between each node and residence time measurements of each traversed node on the end-to-end synchronization path between the Master 106 and the Slave 108.

Although depicted with one peer delay instance per considered segment, a given link/path delay could be measured twice by two peer delay instances, each measurement instance being triggered by one or the two adjacent P2P TCs delineating the considered link/path. But, this targeted redundant operation mode suffers from strong issues especially while considering:

- the objective of these two measurement instances: for a same link/path, these two measurement instances aim at covering the case when synchronization packets transmission directions change relatively to the rules imposed by the PTPV2 standard;
- that both involved ports have to be capable of generating messages. It means that if a failure occurs at one side, e.g. one port unable to generate messages, then both instances fail.

The messages exchanged within a P2P network architecture comprise different fields aiming at sharing synchronization data and/or time distribution information between the network elements. Such messages can be for instance Sync messages as defined in the IEEE 1588V2 standard. One field within the messages is particularly used in a P2P network architecture, it is called the "correction field" as defined in the IEEE 1588V2 standard.

The semantics of the correction field of exchanged messages in a P2P network architecture can cumulate up to three values:

- Network element (NE) transit delays: residence time;
- mean path delays, called "path delays" and;
- path delay asymmetries.

When a failure occurs within a given peer delay mechanism of such an architecture, the downstream (with regards to the time distribution direction) P2P TC has to be declared as in a FULL failure state whereas some of its remaining interesting capabilities could still be maintained for supporting the time distribution (e.g. NE residence time measurements).

The FIG. 1 represents in each NE: $104_1$, $104_2$, $104_3$, an associated peer-to-peer transparent clock (P2P TC): $102_1$, $102_2$, $102_3$. The peer delay mechanism—providing the measurement of an adjacent path delay information, also called peer delay information—allows for cumulating into the correction field CF of the Sync message with said path delay information and residence time across each NE.

The peer delay mechanism is based on a scheme which requires a mechanism for bidirectional message exchanges 120 and 130.

Considering a full failed P2P TC, while only a specific failure at the Peer delay mechanism occurs, limit reconfiguration and protection schemes and consequently yields to non-optimal and non-cost effective solutions.

More specifically, there is no defined mechanism for efficiently managing a failed peer delay mechanism within a chain of P2P TCs.

Currently if a failure is internally detected by a transparent clock itself and that the PTP TCs is declared in a failed state, reactive/proactive operations can be performed.

One solution consists in detecting the failure and replacing a synchronization path between the Master and the Slave by another valid path, like a backup synchronization path.

FIG. 2 represents such a solution in which a backup end-to-end synchronization path 110 is identified and activated in order to allow path delay and residence time measurements.

It exists some mechanisms which allow for informing the related slaves 108 of a failure event along the synchronization path without precisely advertising the specific nature of this failure event.

This advertisement allows a slave-centric approach— meaning that the reconfiguration of the synchronization path is driven by the slave—for triggering the selection of a backup path 110 avoiding the failed transparent clock. In the FIG. 2, the backup path comprises a set of NE $104_4$, $104_5$, $104_6$, $104_7$, which are associated respectively to TCs $102_4$, $102_5$, $102_6$, $102_7$ This solution has two mains drawbacks:

It considers switching the synchronization signal on a backup path: practically, this is not always possible. For instance, when no backup path is available, switching of PTPV2 traffic to the backup path is not allowed as the former is in-band, meaning mixed with users' data traffics.

This solution does not consider the announcement of a specific partial failure event. It means that it only considers a full failure state announcement.

A second solution consists in deploying an internal redundancy in each NE and associated TC. Internal redundancy can be used meaning that an additional protection scheme can be used locally. When the PTPV2 based path delay measurement failed then this measurement operation can be performed by another internal module.

In essence, this solution puts several implementation constraints and is not cost effective.

Indeed, these approaches require the provisioning of internal transparent clock redundancies and switching procedures—which increase the cost of the transparent clock itself—and/or significant reconfiguration times as the synchronization manager is generally a remote element usually located in a central office at the network core level.

Such significant reconfiguration times imply further Slave requirements (e.g. frequency stability, phase transients filtering) and thus an additional cost thereof.

If a failure is not internally detected by the failed/failing transparent clock itself, a reference clock might be used to control the transparent clock frequency deviation. This reference clock could be embedded either locally—i.e. either within the transparent clock or within an associated network element—or could be available through an external synchronization signal, such as a retimed bit stream. In this case, a locking system might be able to detect any deviation between the frequency carried by the retimed signal and the frequency generated by the local oscillator of the transparent clock.

Disappointingly, these methods also required additional costs, for instance in hardware element such as a Phase Locked Loop.

When using a long holdover mode, in case of failure detection, a holdover mode is triggered at the slave level, meaning that the progression of time is driven by the stability of the slave oscillator frequency. This behavior is not relevant for long time holdover. As an illustration, the Time deviation between two high quality/expensive clocks (i.e. Primary References Clocks—ITU-T G.811 characteristics) is already 2 µs per day. Typical slave clocks are far from these best-in-class clocks.

SUMMARY

One object of the invention is to overcome at least some of the inconveniences of the state of the art. Some embodiments of the invention allow to improve and maintain an operational protection schemes for P2P architecture when a failure event occurs disabling the peer delay mechanism between two adjacent P2P TCs.

It is an object of the invention to provide a method for managing an accurate distribution of time in a packet network comprising a plurality of network elements NE allowing packet transmission, the packet network comprising a peer-to-peer transparent clock P2P TC hardware support in at least one network element, the peer-to-peer transparent clock P2P TC being at least used in order to measure and correct:

path delays between two adjacent network elements implementing the peer delay mechanism of said packet network and;

residence times in each traversed network element of said packet network, of time-stamped packets, within a Master/Slave end-to-end synchronization path comprising a first set of network elements and their associated peer-to-peer transparent clocks, the Master and Slave exchanging time stamped packets through the first set of network elements, each time stamped packet comprising at least a correction field CF indicating the cumulated transmission delay of the said packet along the end-to-end synchronization path, the correction field CF being updated by each network element of the first set.

The method comprises:
  detecting a failure event in the end-to-end synchronization path by a first element of the first set;
  storing by the first element a measured past path delay of at least one previously transmitted time stamped packet received by the first element;
  calculating a new correction field value being a function of:
    the incoming current value of the received correction field in the first network element;
    the first network element residence time;
    a first value depending of at least one measured past path delay value by the first element.

In one preferred embodiment, the method comprises generating a first stability indicator reflecting the risk of using a past path delay value instead a measured one when detecting a failure event by the first element to the Slave.

The stability indicator allows for assessing the potential time distribution error from the master to the slave of using a past path delay value instead a measured one when detecting a failure event by the first element to the Slave.

Advantageously, the first network element detects an internal failure event occurring within the path delay measurement between the first network element and its upstream adjacent neighbour.

Advantageously, the first network element detects a failure event occurring in its upstream adjacent neighbour.

Advantageously, the current value of the correction field CF of at least a time-stamped packet transiting in the first element is updated with the transit value.

Advantageously, the new correction field value is transmitted to the Slave through a time-stamped packet transiting in the first element in a TLV field—TLV referring to the "Type Length Value"—of the said time-stamped packet.

In another embodiment, at least one of the previous past path delay values, for instance the last recorded in the first element, is transmitted to the Slave through a time-stamped packet transiting in the first element in a TLV field of the said time-stamped packet. In that embodiment, the Slave computes the new correction field value instead the first element.

Advantageously, the first value is a function of a previous set of past path delays which are stored in the first element.

Advantageously, in one embodiment, the first value is a mean value of a previous set of past path delays which were stored in the first element. In another embodiment, the first value is the last path delay which was stored by the first element.

In a particular mode of the invention, the failure event disables the peer delay mechanism of the P2P protocol between the first element and its upstream adjacent neighbour in the synchronization path. The method is particularly suited to this context.

Advantageously, the first indicator is generated in a signalling message belonging to the IEEE 1588V2 protocol from the PTP protocol.

Advantageously, the first indicator is generated in a specific created TLV field of a PTP message, the TLV being added to the time-stamped packet by the first network element.

Advantageously, the correction field is in the header of a signalling message from the PTP protocol.

Advantageously, the correction field value of each time stamped message transiting in the said first element is updated when failure event is detected by the first element.

Furthermore, one other object of the invention concerns a network element for updating at least a field of data of at least a message transiting in a packet network, the said network element allows detecting a failure event occurring in a path delay measurement mechanism, the network element being associated to a peer-to-peer transparent clock in order to determine and correct path delays and network element (NE) residence time of time-stamped packets, each time stamped packet comprising at least a correction field CF indicating the current cumulated residence times and path delays of the said packet on the synchronization path.

The network element and its associated P2P transparent clock allow for:
- detecting a failure event in the end-to-end synchronization path of the first set;
- storing a measured past path delay of at least one previously transmitted time stamped packet;
- calculating a new correction field value being a function of:
  - the incoming current value of the received correction field;
  - the first network element residence time;
  - a first value depending of a measured past path delay value;
- generating a first stability indicator reflecting the risk of using a past path delay value instead a measured one when detecting a failure event by the first element to the Slave.

BRIEF DESCRIPTION OF THE DRAWINGS

These and other aspects of the invention will be apparent from and elucidated with reference to the embodiments described hereafter with reference being made to the drawings in which.

DETAILED DESCRIPTION

In the following description, a PSN defines a "Packet Switched Network". The Precise Time Protocol is called "PTP" and refers hereafter to the IEEE 1588 v2 standard.

Figure 3:
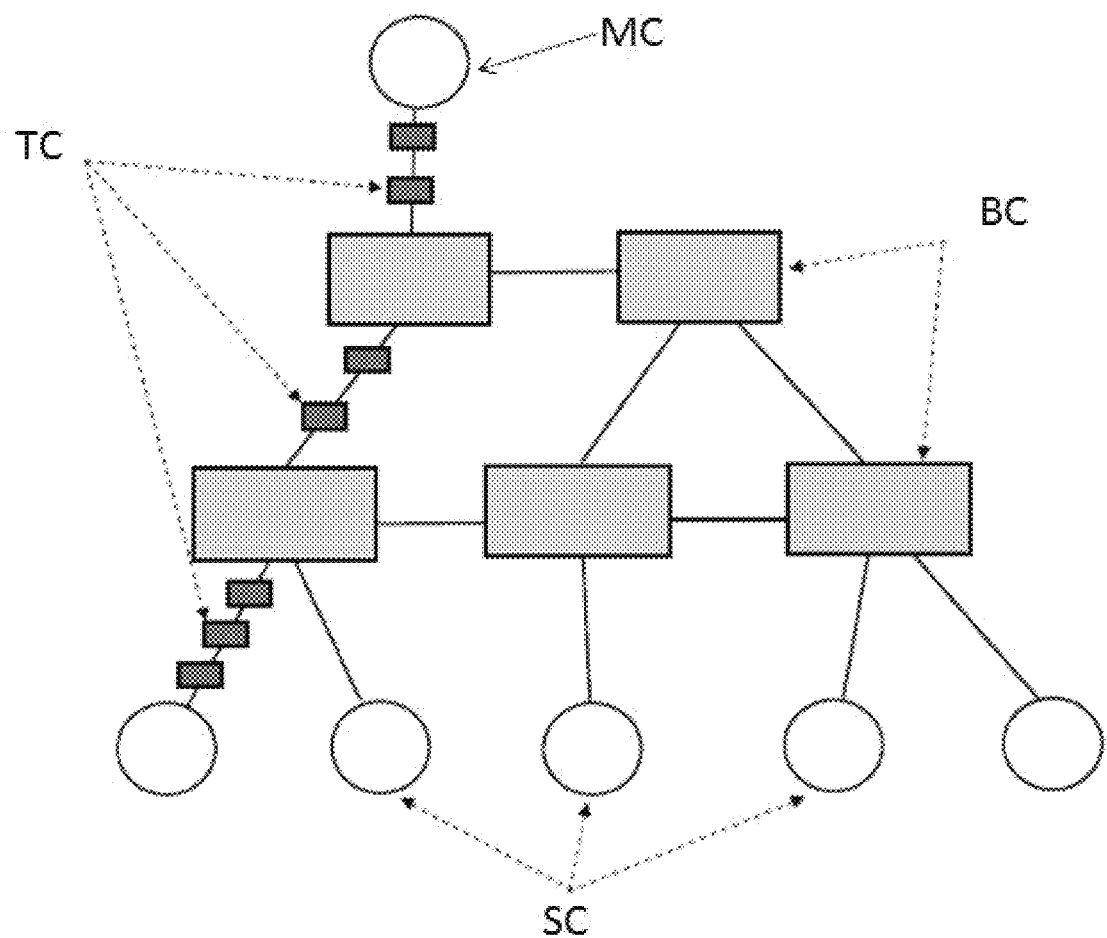
FIG. 3 illustrates a packet network implementing a method according to the invention.

FIG. 3 represents a hierarchical synchronization architecture of time distribution in a PSN network. In such network, a grandmaster clock MC distributes a reference time through the network to slave clocks SC. Additionally to the MS and SC, a set of P2P transparent clocks TC and boundary clocks BC allows peer delay mechanism in the network.

The boundary clock BC allows for segmenting the synchronization network into areas with bounded packet delay variation. The grandmaster MC, the boundary clocks BC and the slave clocks SC are organized into a tree-like hierarchy with the grandmaster as the root of this hierarchy, the slave clocks as its leaves, and boundary clocks as intermediate elements. The grandmaster distributes the time reference towards the slave clocks across this tree-like hierarchy. The synchronization path between the grandmaster MC and a given slave clock SC can be decomposed as a succession of pairs of Master and Slave with one Slave of the upstream segment/area becoming the Master of the downstream segment/area. Between a given pair of the aforementioned Master and Slave are deployed P2P Transparent clocks TC. The later allow for taking into account the overall end-to-end transmission delays of PTP packets between the Master and the Slave.

In such related synchronization architecture, for each network element, called NE, along the end-to-end communication path between a Master and a Slave, a P2P TC is implemented. Each NE is associated to a P2P TC. This latter particularly allows for measuring PTPV2 message residence time within the NE, also called transit delay, and adjacent upstream path delays of the 1588V2 event message/packet.

A NE may be for instance a router or a switch.

Figure 1:
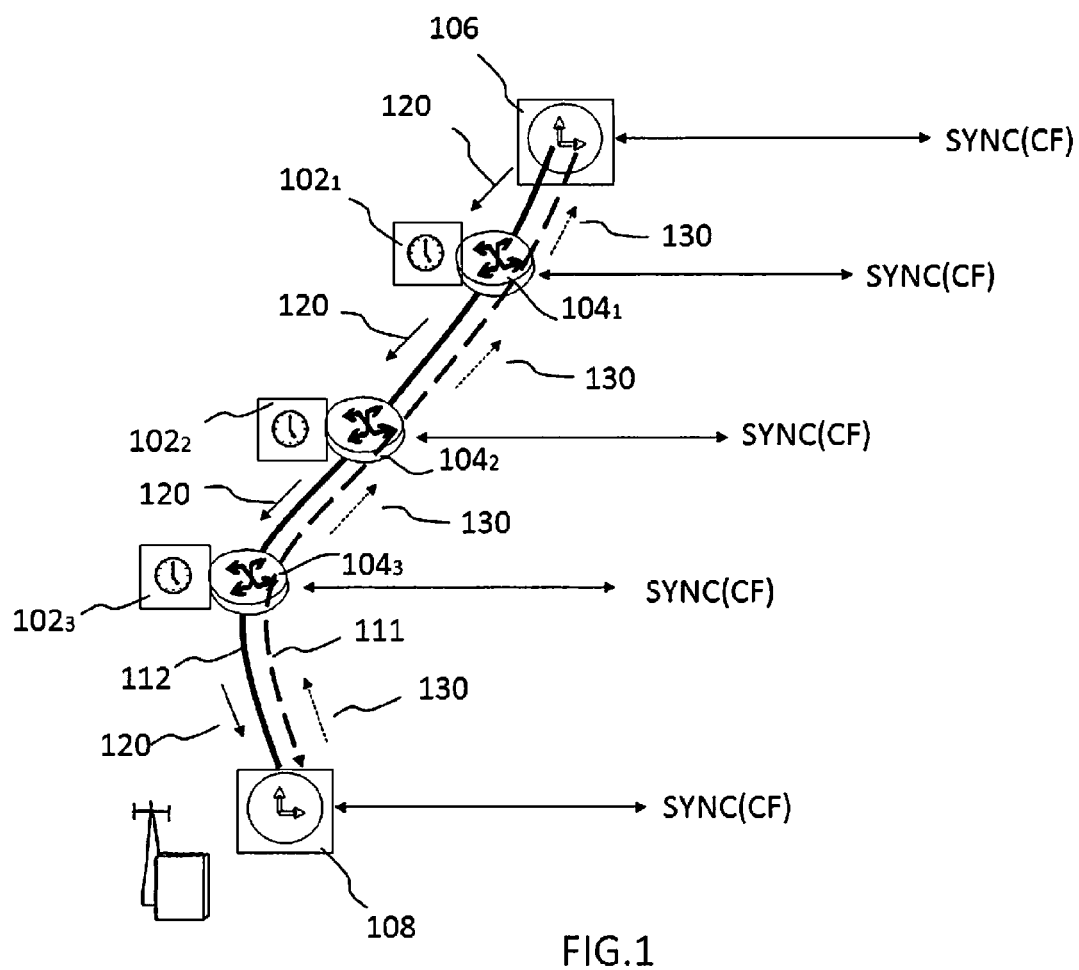
FIG. 1 illustrates an end-to-end synchronization path between a Master and a Slave through different NEs and P2P TCs used in the current solutions.
Figure 2:
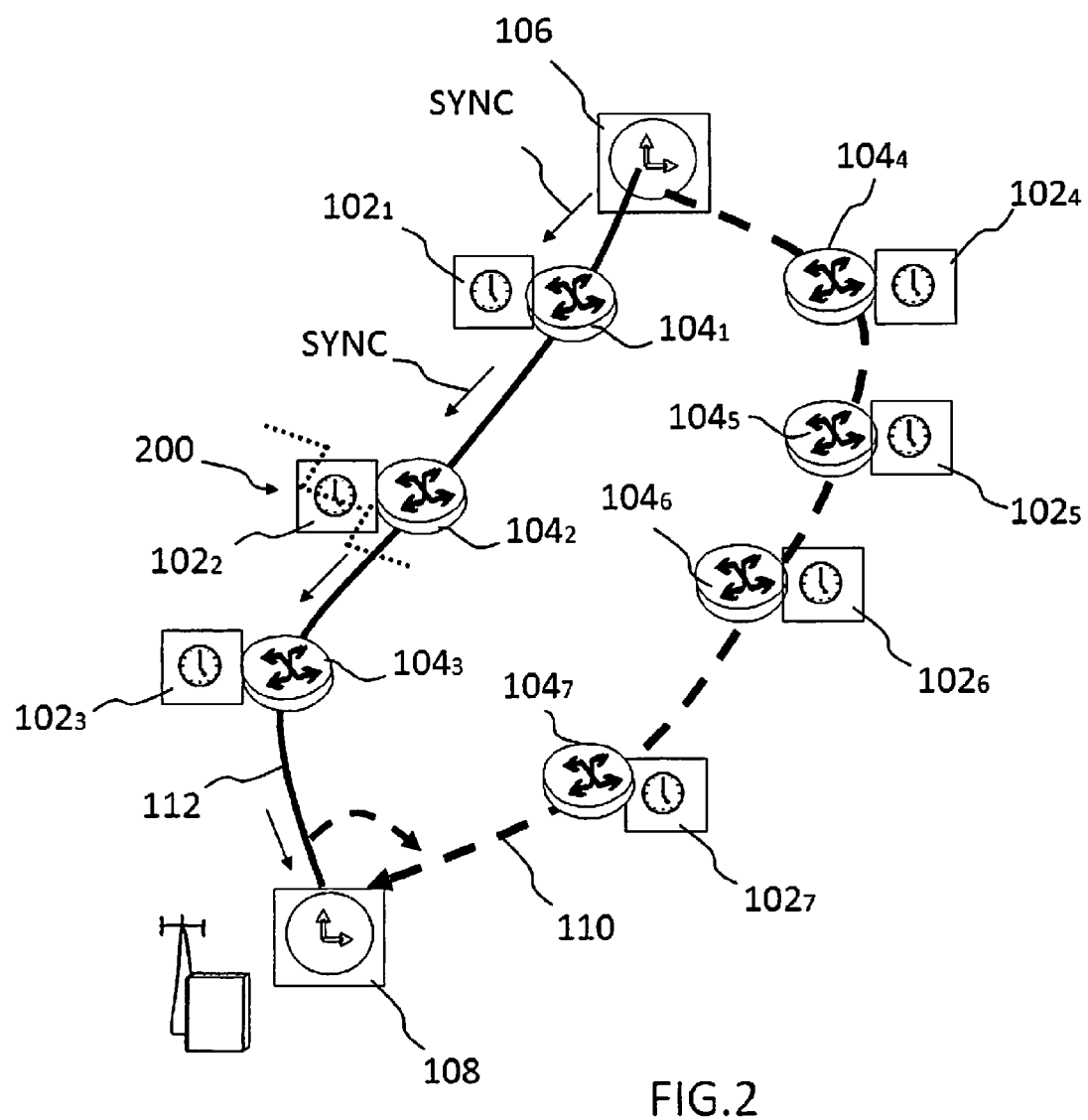
FIG. 2 illustrates a solution of the state of the art when a failure occurs by reconfiguring a backup synchronization path.
Figure 4:
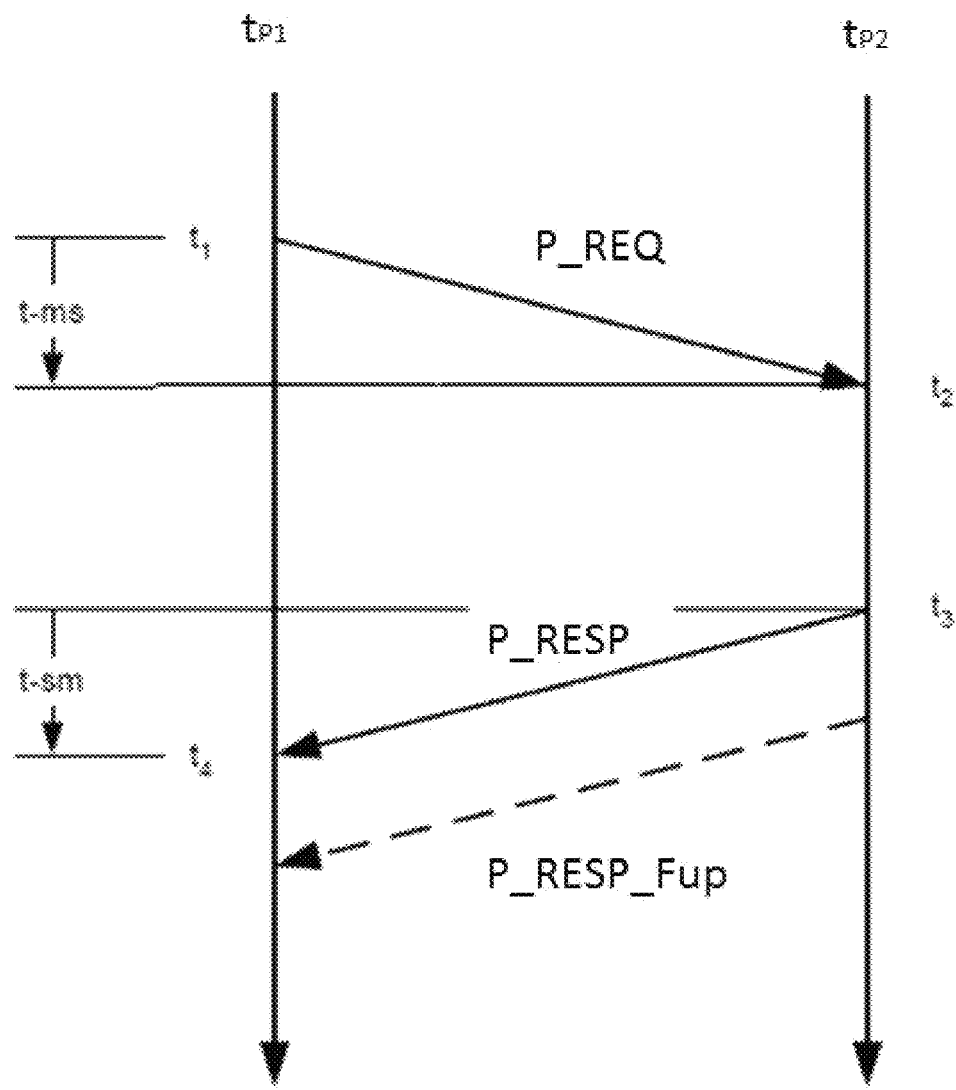
FIG. 4 illustrates the peer delay mechanism of a P2P transparent clock architecture.

FIG. 4 represents the peer delay mechanism of a P2P transparent clock architecture as described within the IEEE 1588V2 standard. This mechanism allows for measuring the path delay between two ports that implement the peer delay mechanism. This measurement is conducted by all ports of a network element implementing the said mechanism. Both ports, sharing a given link/path, independently make the measurement and both ports know the path delay. The path delay measurement starts with port 1 issuing a P_REQ message, also known as "Pdelay_Req message" and generating a timestamp t1 for the P_REQ message. $t_{P_1}$ represents the time scale in port 1 of a first peer entity P1. P_REQ messages are represented by arrows 130 on FIG. 1, 5.

Port-2 receives the P_REQ message and generates a timestamp t2 for this message. Port-2 returns a P_RESP, also known as "Pdelay_Resp message", and generates a timestamp t3 for this message. $t_{P_2}$ represents the time scale in port 2 of a second peer entity P2. P_REQ messages are represented by arrows 120 on FIG. 1, 5.

In order to minimize errors due to any frequency offset between the two ports, Port-2 returns the P_RESP message as quickly as possible after the receipt of the P_REQ message.

Port-2 either:
returns the difference between the timestamps t2 and t3 in the P_RESP message;
returns the difference between the timestamps t2 and t3 in a P_RESP_Fup, also known as "Pdelay_Resp_Follow_Up message";
returns the timestamps t2 and t3 in the P_RESP and P_RESP_Fup messages, Respectively Port-1 generates a timestamp t4 upon receiving the P_RESP message. Port-1 then uses these four timestamps to compute the mean path delays.

As defined in the IEEE 1588V2, the peer delay mechanism mainly consists of the exchange of P_REQ/P_RESP messages in order to measure the mean path delay between 2 PTP peers implementing the peer delay mechanism while considering opposite communication directions. This latter "link/path delay" is called "path delay".

The method of the invention allows maintaining operations of path delay measurements in a degraded context. The degraded context corresponds to a failure events related to the peer delay mechanism on P2P TCs, i.e. related to the path delay measurement mechanism. In that case, the failure event disables the nominal path delay measurement of the peer delay mechanism.

The method of the invention is related to a one-step mode, i.e. without implementing the P_RESP_Fup message, or to a two-step-mode, i.e. implementing P_RESP_Fup message.

The method of the invention is related either to a one-way mode or a two-ways mode. It means that the invention is applicable to the unidirectional message transmission from the Master to the Slave (i.e. Sync transmission only) and PTV2 messages in both communication direction (i.e. exchange of Sync, Delay_Req and Delay_Resp). Nevertheless the invention appears particularly advantageous in the one-way and multicast modes.

Figure 5:
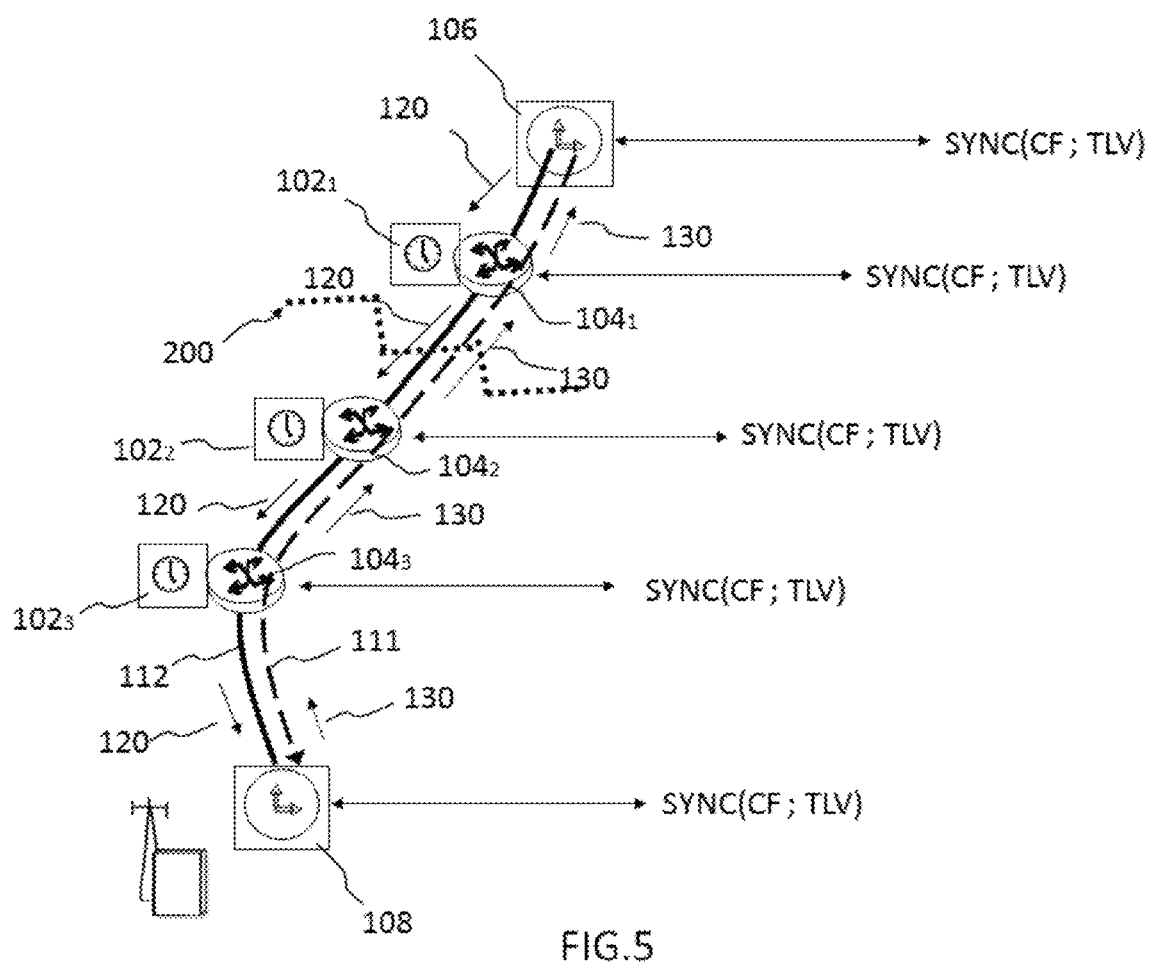
FIG. 5 illustrates the packet network of FIG. 1 wherein a P2P TC presents a failure.

FIG. 5 represents a end-to-end synchronization path a Master and a Slave of a packet network wherein the end-to-end synchronization path presents such a failure as described above. The method of the invention allows for updating the correction field of at least a SYNC message in order to maintain the synchronization chain in a degraded state as per lack of peer delay measurements between 2 peers implementing the peer delay mechanism such as 2 P2P TCs. The scope of the invention is applicable to messages which carry data field comprising data as defined in the correction field of SYNC messages.

In reference to FIG. 5, a packet network comprises P2P transparent clocks $102_1$, $102_2$, $102_3$ in order to measure the respective residence times of packets through elements $104_1$, $104_2$, $104_3$ of said network.

More precisely each network element $104i$ is associated to a P2P TC $102_i$ whose functions consist in measuring the network element residence times and the network element upstream path delay information related to the time-stamped packets transmitted between a Master 106 and a Slave 108 through at least one end-to-end path 112.

In this embodiment, said control packets and pair of Master 106 and Slave 108 operates accordingly to the IEEE 1588V2 protocol already mentioned.

Transparent clocks $102_1$, $102_2$, $102_3$ operations, according to said protocol IEEE 1588V2, are especially dedicated to fight out the packet jitter—i.e. the Packet Delay Variations (PDVs)—within the network as well as the PDV-induced communication path delay asymmetry, often mentioned as "network noise", whereby the communication delay of one PTPV2 message in one direction (e.g. from Master 106 to Slave 108) significantly differs from the delay of a related PTPV2 message (i.e. with the same sequence number) in the opposite direction (e.g. from Slave 108 to Master 106), which is inherent to PSNs ("two-ways" approach).

Considering a P2P transparent clock scheme, a one-way time distribution, from the Master to the Slave is generally sufficient and efficient, for achieving stringent synchronization requirement at the Slave level.

Thus, without P2P transparent clock, the PTPV2 performance is very dependent on the network traffic load which is by nature unpredictable and dependent on the variability of the cumulated path delays along the end-to-end synchronization path. In order to overcome peer delay mechanism failures in an efficient way, each peer-to-peer transparent clock implements the method of the invention.

According to a first aspect of the invention dealing with a first step, the method allows the detection of a failure at the peer delay mechanism level by a network element. Depending of the localization of the failure, at least one network element is able to detect the failure event.

It exists different methods allowing a failure detection. According to FIG. 4 when a message expected as described above, i.e. P_REQ, P_RESP or P_RESP_Fup, is not received by a network element, an alarm can be raised in order to alert a failure event.

The methods described in the patent application EP2367309 can also be used in order to detect and alert such a failure event.

In FIG. 5, a failure event 200 occurs on the link/path between NE $104_1$ and NE $104_2$. The failure event is such that it only disables the peer delay mechanism between NE $104_2$ and NE $104_1$.

According to a second aspect of the invention dealing with a second step, the said network element and its associated transparent clock allows for updating some data from specific time stamped packets. The updated data allow for maintaining the synchronization path and allow for informing the Slave of the failure event in the network and its localization.

According to a third aspect of the invention dealing with a third step, the method allows for generating a specific indicator indicating the localization of the peer delay mechanism failure event to the impacted Slave.

The method of the invention allows using SYNC message which is sent from the Master NE 106 to at least a Slave NE 108.

The SYNC message has a specific field as described above, called "correction field", which indicates a cumulated value of residence time and path delays of the transmitted SYNC message along the end-to-end synchronization path 112. While considering a full P2P TC support, It comprises the transit delay across each NE and each link/path delay between NE.

The method of the invention allows for detecting a failure event which disables the peer delay mechanism.

When the failure event occurs in the path between two adjacent NEs (or two PTP peers implementing the peer delay mechanism), both NEs may detect any dysfunction with its neighbor. It means that both NEs are able to detect a failure event at the peer delay mechanism level.

When a failure event occurs in a given NE, the failure event disables at least the peer delay mechanism on at least a second adjacent NE located downstream between the Master and the Slave. The second NE is capable of detecting a failure event occurred upstream on the link/path. Alternatively, the first NE can also detect the failure event thanks to an internal mechanism.

The method of the invention comprises a step which allows for detecting a failure event impacting the peer delay mechanism between two adjacent NEs.

When such a failure event is detected by a pair of adjacent NE/P2P TC, the method of the invention allows for a local updating of the correction field of the SYNC message with at least a past value of the measured path delay, called a "measured past path delay value". If the method is applied to messages equivalent to SYNC messages, the updating step of the method remains unchanged.

The past value is stored in the P2P TC prior to the failure event. The past value is used instead of the real-time one. The invention allows for using memory capabilities of the NE or the associated P2P TC for storing at least one past value of the measured path delay in order to update the correction field of the SYNC message when a failure occurs.

In that aspect, the method of the invention allows an advertisement to the impacted Slave of a failure event at the peer delay mechanism level and the impact of the used protection schemes in terms of stability.

An indicator is used for this purpose. This indicator particularly allows the Slave for taking reconfiguration decisions for instance.

In a first embodiment, the indicator could be supported by the header of the SYNC message in an unoccupied/undeveloped field of the header (e.g. Control Field).

In a second embodiment, the indicator could be supported by a TLV, referring to the "Type Length Value" semantics within SYNC messages.

In a third embodiment both the updated value of the CF and the indicator could be supported by a TLV extension field of a time stamped packet.

This indicator has at least two roles.

A first role comprises indicating a failure event for the peer delay mechanism. This is a "failure indicator" which is an alarm dedicated to inform the impacted Slave with the following goals:

to control the stability of the protection mechanism;
to localize the failure in the end-to-end synchronization path 112 and the impacted peer delay mechanism between two adjacent ports and the possibly port responsible for that failure.

A one-bit ID field can be used with ID=1 for indicating a working peer delay mechanism or ID=0 for a failed one. Another field may be assigned for announcing the failed peer delay port.

A second role comprises indicating the stability of such protection scheme on the distribution of time. In that case, the indicator can be considered as a "stability indicator". Although demonstrating low variations along time, corresponding for instance to optical transmission delays, the delay variability of the missing/assessed path delay may finally have an impact on the time accuracy at the Slave level after a given observation time. The method of the invention allows for controlling and managing this risk.

Accordingly, this stability indicator announces:
the provisioned path delay with the date of estimation or measurement;
the typical variance/stability of this delay over one or different observation times.

In others embodiments, the failure indicator and the stability indicator may be supported by dedicated Announce or Follow-up messages. Although P2P TCs are by principle transparent to the Announce message, they may be implemented in such a way.

In one embodiment, the indicator when indicating a failure event cannot be modified by others NE of the synchronization path. It ensures a good transmission to the Slave of the localization of failure event.

Accordingly, an impacted Slave of a failed synchronization link/path can take advantage of the protection scheme stability indicator by finally triggering or not triggering the holdover mode or a path reconfiguration avoiding the failed P2P TC, e.g. switching to a backup path.

The method of the invention allows a local handling of the modification of the SYNC message which transits across the NE $104_2$ which has detected the failure event.

The method of the invention allows for updating the data of the correction field of at least a SYNC message transiting in the network element $104_2$ with a new value once the failure event has occurred.

The new correction field value, is a function of:
the current value of the correction field of the incoming SYNC message;
the network element residence time;
a first value depending on a measured past path delay value.

If the correction field is called CF, and a past path delay value is called P_LD, we have:

$$\text{Outgoing\_}CF \text{ value} = \text{Incoming\_}CF \text{ value} + NE \text{ residence time} + P\_LD.$$

A past path delay value can result from an average of several past values. For instance, an average past path delay value can be defined as the average of N measured past delay values stored in the NE/P2P TC. In one embodiment N=3 last stored values.

The correction may be performed according to the link/path connected to the ingress port of the SYNC message and according to the link/path connected to the egress port for P_REQ messages.

In one embodiment of the invention, the TLV field may be updated with statistical data allowing post-processing analysis by an impacted Slave.

The TLV of the SYNC message may be updated with:
the past path delay information
the variance of a set of past path delay information
observation time
environmental conditions such as temperature.

The method of the invention allows for establishing a protection methodology addressing a peer delay mechanism failure.

Only a failed path delay measurement is rejected from the synchronization signal, still taking advantages of the other resources or information on the end-to-end synchronization path (NE residence time and path delay measurements of other links or paths).

This mode is theoretically better than a pure holdover mode which drives the progression of time with respect the local Slave frequency reference.

This mode is also theoretically better than the scenario considering P2P TCs as E2E TCs, meaning that all peer delay mechanisms are deactivated while considering a two-way signalling between a Master and a Slave. Indeed, for this latter case, time accuracy at the Slave level depends on the variability of ALL path delays of the synchronization chain whereas the presented solution considers the impact of only one missing path delay measurement.

As an illustration, considering a long synchronization chain with 9 P2P TCs and thus 10 path delays then in case of a failure event on a peer delay mechanism related to a P2P TC, the impact of path delay stability on the time accuracy would be reduced by a 10 ratio.

The mean path delay could be provided by the peer delay mechanism at the PTPV2 level or by similar mechanism at the physical layer.

The method of the invention aims at offering a suitable protection scheme for P2P TCs experimenting a failure at the peer delay mechanism level. The proposed solution allows for using P2P TCs in a degraded mode, meaning that it saves synchronization resources. Accordingly these well suited solutions are cost-effective comparatively to general state-of-the-art protection schemes.

The presented solution allows for keeping the same synchronization topology within an optimized one-way and multicast mode.

The method of the invention allows better resource provisioning, resource allocation and stability of the synchronization topology than the solutions from the state of the art.

The different aspects of the invention particularly cover the mobile network application demonstrating stringent frequency and time accuracy requirements (e.g. microsecond time accuracy) at the slave level. A full P2P Transparent Clock deployment is one viable approach for addressing such an issue.

As mentioned above, this proposal can particularly be well-suited for a full deployment of P2P TCs where a P2P TC is implemented on every NE within the PSN but, depending on the embodiments, this "full deployment" implementation might not be required. For instance, end-to-end TC or PTP-unaware network elements can be intermediate elements between 2 (adjacent) P2P TCs.

The invention claimed is:

1. Method for managing an accurate distribution of time in a packet network comprising a plurality of network elements allowing packet transmission, the packet network comprising a peer-to-peer transparent clock hardware support in at least one network element, the peer-to-peer transparent clock being at least used in order to measure and correct delays of:
   path delays between two adjacent network elements of said packet network and;
   residence times in each traversed network element of said packet network,
of time-stamped packets, this capability defining a peer delay mechanism, a Master/Slave end-to-end synchronization path comprising a first set of network elements and their associated peer-to-peer transparent clocks, the Master and Slave of the end-to-end synchronization path exchanging time stamped packets through the first set of network elements, each time stamped packet comprising at least a correction field indicating the cumulated transmission delay of the said packet along the end-to-end synchronization path, the correction field being updated by each network element of the first set, wherein the method comprises:
   detecting a failure by a first element of the first set in the end-to-end synchronization path between a first element and its upstream adjacent neighbour, both implementing a peer delay mechanism;
   storing by the first element a measured past peer delay of at least one previously transmitted time stamped packet received by the first element;
   calculating a new correction field value being a function of:
      the incoming current value of the received correction field;
      the first network element residence time;
      a first value depending of a measured past path delay value.

2. Method according to claim 1, wherein the method comprises generating a first stability indicator of the path delay when detecting a failure event by the first element to the Slave.

3. Method according to claim 1, wherein the first network element detects an internal failure event occurring within the path delay measurement of the path between the first network element and its upstream adjacent neighbour.

4. Method according to claim 1, wherein the first network element detects a failure event occurring in its upstream adjacent neighbour.

5. Method according to claim 1, wherein the current value of the correction field of at least a time-stamped packet transiting in the first element is updated with the first value.

6. Method according to claim 1, wherein the new correction field value is transmitted to the Slave through a time-stamped packet transiting in the first element in a TLV field of the said time-stamped packet.

7. Method according to claim 1, wherein the first value is a function of a previous set of past path delays which are stored in the first element.

8. Method according to claim 1, wherein the failure event disables a peer delay mechanism of a P2P protocol between the first element and its upstream adjacent neighbour within the synchronization path.

9. Method according to claim 2, wherein the stability indicator allows for assessing the potential time distribution error from the master to the slave of using a past path delay value instead a measured one when detecting a failure event by the first element to the Slave.

10. Method according to claim 9, wherein the stability indicator indicates:
    a provisioned path delay with the date of estimation or measurement;
    the typical variance/stability of this path delay over one or different observation times.

11. Method according to claim 9, wherein the stability indicator comprises measured statistical data allowing post-processing analysis by an impacted Slave of the end-to-end synchronization path, the measured statistical data comprising at least one measured information from the following list:
    a past path delay information;
    a variance of a set of past path delay information;
    an observation time information;
    environmental conditions information, including temperature.

12. Method according to claim 2, wherein the first indicator is generated within a signalling message from a PTP protocol.

13. Method according to any claim from 12, wherein the first indicator is generated in a specific created TLV field of a PTP message, the TLV being added to the time-stamped packet by the first network element.

14. Method according to claim 1, wherein the correction field of each time stamped message transiting in the said first element is updated when failure event is detected by the first element.

15. Network element for updating at least a field of data of at least a message transiting in a packet network, the said network element allows detecting a failure event occurring in the measurement of a peer delay, the network element being associated to a peer-to-peer transparent clock in order to determine and correct peer delays and network element residence time of time-stamped packets, each time stamped packet including at least a correction field indicating the current cumulated transmission delay of the said packet on the end-to-end synchronization path, wherein the network element comprises a memory and a P2P transparent clock configured to:
- detecting a failure event in the end-to-end synchronization path of a first set;
- storing a measured past path peer delay of at least one previously transmitted time stamped packet;
- calculating a new correction field value being a function of:
  - the incoming current value of the received correction field;
  - a residence time of the first network element;
  - a first value depending of a measured past path delay value by the said network element.

16. Network element according to claim 15, wherein the network element and its associated P2P transparent clock allow generating a first indicator when detecting a failure event by a first element to a Slave.

* * * * *